April 19, 1960 R. W. McBRIEN 2,933,376
TITRATION APPARATUS
Filed Jan. 28, 1957 2 Sheets-Sheet 2
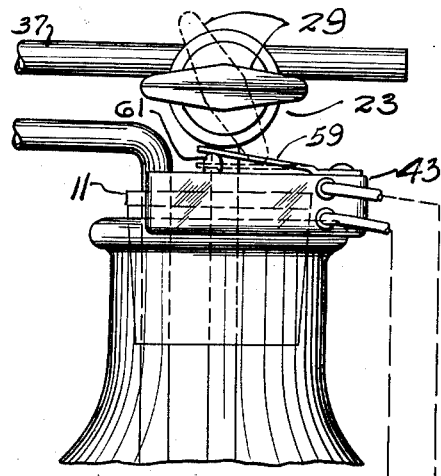
FIG. 6.
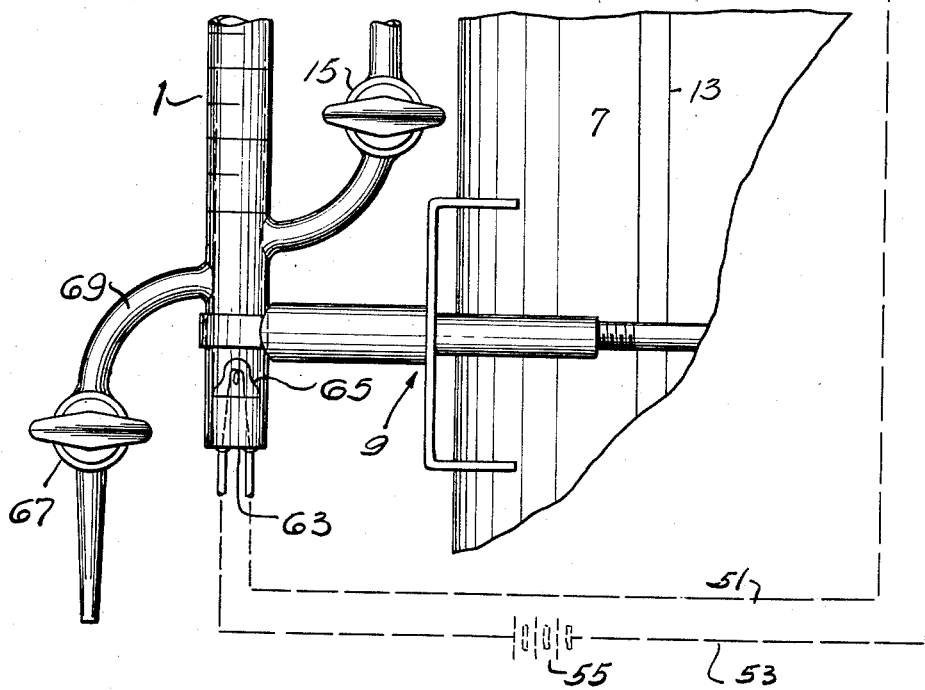
Inventor
Roger W. McBrien
By Rodney Bedell
Atty.

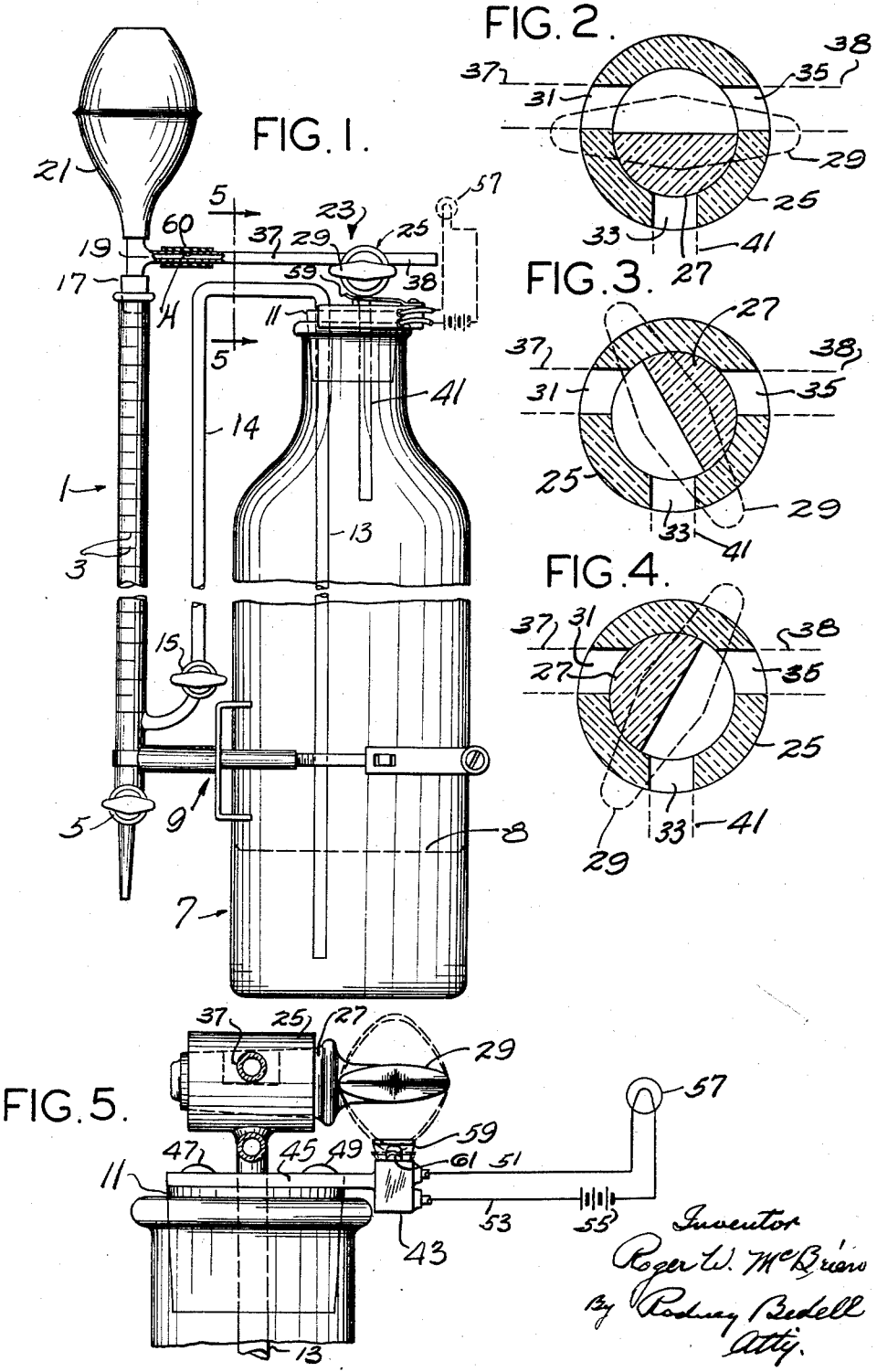

United States Patent Office 2,933,376
Patented Apr. 19, 1960

2,933,376

TITRATION APPARATUS

Roger W. McBrien, East Alton, Ill.

Application January 28, 1957, Serial No. 636,722

8 Claims. (Cl. 23—259)

This invention relates to titration apparatus and more particularly to a readily portable titration apparatus of compact construction which effectively minimizes contact with the atmosphere of reagent solutions to be titrated.

Among the objects of the present invention are to facilitate the use of standard reagent solutions from their original containers with a buret attached thereto; the effective minimizing of contact of such reagent solutions with the atmosphere, thereby eliminating evaporation and/or contamination of the reagent solutions; ready movement of the titration apparatus from one location to another; the requirement of only a small amount of laboratory shelf or bench space and the ready adjustment for use at various elevations; the providing for titrations to be carried out with greater speed and accuracy; the provision of signal means for visually indicating when the apparatus is closed to the atmosphere; and the effective illumination of the meniscus of liquid in the buret. Other objects and features will be in part apparent and in part pointed out hereinafter.

In the accompanying drawings, in which several of various possible embodiments of the invention are illustrated:

Figure 1 is a side elevation of one embodiment of the titration apparatus of the present invention, with parts broken away, and a lighting circuit shown diagrammatically;

Figure 2 is a transverse section of a valve of Figure 1, showing the valve set in a venting position;

Figure 3 is a transverse section of the same valve showing the valve set in a closed position;

Figure 4 is a transverse section of the same valve showing the valve set in a fill position;

Figure 5 is an enlarged scale vertical section on line 5—5 of Figure 1; and

Figure 6 is a side elevation of an alternative embodiment of the titration apparatus of the present invention, with parts being broken away.

In performing volumetric chemical analyses, the common titration operation involves the measurement of the amount of a standard reagent solution, i.e., a solution of known strength, required for reaction with a sample. This operation is carried out in a buret comprising a long glass cylinder of uniform bore for measuring the volume of standard reagent solutions delivered therefrom during a titration. Since chemical analyses must be carried out with a high degree of accuracy and care, it is essential that precaution be taken to avoid contamination of the reagents employed with impurities. It has been common practice, preparatory to carrying out a titration, to fill a buret with a standard reagent solution by means of a pipet or by means of gravity flow from a container positioned above the buret. In either event, the standard solution is exposed to the atmosphere during transfer from the pipet or container to the buret or after the buret is filled and during titration. Such exposure to the atmosphere may introduce contaminating gases from the atmosphere into the standard solution and thereby affect the accuracy of the results obtained. Moreover, burets containing standard solutions may be left standing overnight with the solutions therein exposed to the atmosphere and therefore subject to evaporation and contamination. Even if this practice is not followed and burets are emptied and filled with distilled water at the conclusion of each day's work, it is necessary to carefully rinse the buret on the succeeding day prior to re-filling the buret with a standard solution for further titration. Here again, the filling operation as described above may lead to evaporation or contamination of the standard solution.

In accordance with the present invention, titration apparatus is provided which substantially eliminates the difficulties referred to above and permits rapid, accurate titrations to be conveniently carried out with a minimum of evaporation or atmospheric contamination of the standard reagent solutions. Also, the titration apparatus of the present invention is of simple and compact construction and eliminates the need for using funnels, beakers or the like for filling the buret.

The term buret as employed herein includes both burets and pipets used in performing titrations.

In Figure 1, a conventional buret 1 is shown with calibrations 3 and a drain 5. Buret 1 is mounted alongside a container 7 containing a standard reagent solution 8 by means of a clamp 9. Any conventional clamp may be employed for securing buret 1 to container 7, but it is preferred that the clamp described and claimed in my U.S. Patent 2,693,015 be used in the practice of the invention. Container 7 is fitted with a two-hole stopper 11 of rubber or the like. A U-shaped tube has a leg 13 which extends downwardly through the stopper to near the bottom of the container and a leg 14 which extends to near the lower end of buret 1. Tube leg 14 is provided with a stopcock 15 for admitting liquid 8 from container 7 through the tube 13, 14 into the buret. The upper end of the buret is fitted with a stopper 17 for receiving a conduit 19 connected to a collapsible bulb 21.

At 23 is indicated a valve consisting of a tapered body 25 and a tapered plug 27 having a handle 29. Valve 23 has a first port 31, a second port 33 and a third port 35. A tube 37 extends from the portion of the tube 19 lying between stopper 17 and rubber vacuum bulb 21 to first port 31, and a tube 38 leads away from third port 35 and is open to the atmosphere. Tube 41 extends from second port 33 down through stopper 11 into container 7. Valve 23 may be set in a closed position (Figure 3) in which ports 31 and 33 are connected and all three ports are blocked from the atmosphere. Valve 23 may be set in a venting position (Figure 2) in which port 31 is connected to port 35 and to the atmosphere, and port 33 is blocked from the atmosphere. Valve 23 may be set in a fill position (Figure 4) wherein second port 33 is connected to third port 35 and first port 31 is blocked from the atmosphere and from the container.

Operation is as follows:

When it is desired to fill buret 1 with a standard reagent solution 8 from container 7 preparatory to carrying out a titration with the standard solution, both cocks 5 and 15 are closed (Figures 1 and 6). Valve 23 is then set in venting position by turning handle 29 to the position shown in Figures 1, 2, 5 and 6 in which first port 31 is connected to third port 35 and second port 33 is blocked from the atmosphere. Bulb 21 is then squeezed to vent air to the atmosphere through port 35. While squeezing bulb 21, handle 29 of valve 23 is turned to set valve 23 in a fill position wherein second port 33 is connected to third port 35 and first port 31 is blocked from the atmosphere. Thus, air is admitted to container 7, and bulb 21 is released to draw air from buret 1 into the bulb. Then by opening stopcock 15, standard solution 8 will flow from container 7 to buret 1 through tube 13, 14. When buret 1 has been filled to the desired level, draincock 15 is closed and valve 23 is adjusted to the venting position (Figure 2) thereby sealing the standard solution in container 7 from the atmosphere. Stopcock 15 may then be opened and closed in adjusting the level of solution in buret 1 to the desired initial reading. The apparatus is then ready for titration by opening draincock 5. After titration, valve 23 is returned to its normal closed position (Figure 3) in which second port 33 and third port 35 are blocked from the atmosphere. When the apparatus is not in use, valve 23 is set in the closed position (Figure 3) so as to exclude the atmosphere from buret 1 and container 7 to avoid evaporation of the standard solution and/or contamination thereof by gases from the atmosphere.

Where the level of solution in container 7 is lower than the level of solution in buret 1, solution from buret 1 may be returned to container 7 by opening stopcock 15 which permits the solution to flow by gravity from the buret to the container. Also, when valve 23 is set in the fill position (Figure 4) and cocks 5 and 15 are left open, the contents of container 7 may be syphoned out through the buret to fill another container.

Figures 1 and 5 show a feature of the invention in which the titration apparatus includes a switch 43 having a plate 45 extending therefrom, the switch being secured to stopper 11 by screws 47 and 49 extending through plate 45. Wires 51 and 53 are connected to battery 55 and lamp 57. Switch 43 has a spring finger 59 adapted, upon deflection, to engage button 61. The switch is normally closed so that when valve 23 is in the venting position (Figure 2) or the fill position (Figure 4), lamp 57 is energized, thereby providing a signal that the apparatus is open to the atmosphere. When valve 23 is set in the closed position (Figure 3) by turning handle 29 to the position shown in dotted lines in Figure 5 the handle deflects spring finger 59 to the position shown in dotted lines in Figure 5 so as to engage button 61 thereby holding open switch 43 and deenergizing lamp 57. Thus, when the titration apparatus of the invention is not in use, lamp 57 will be deenergized, thereby indicating that the apparatus is safely closed to the atmosphere. On the other hand, when lamp 57 is energized, a signal is provided that the apparatus is open to the atmosphere and should therefore be closed if no more titrations are to be performed.

Figure 6 shows a further embodiment of the invention in which the lower end of buret 1 is closed, with a lamp socket 63 provided with an electric lamp 65 therein. Lines 51 and 53 are connected to battery 55 and switch 43 as described above in connection with Figures 1 and 5. Buret 1 is provided with draincock 67 in tube 69 extending outward and downward at a point just above lamp 65 in the lower end of the buret. When buret 1 is being filled or when a titration is being performed and valve 23 is set in either the venting positions (Figure 2) or the fill position (Figure 4), switch 43 is closed and electric lamp 65 is energized, thereby directing light upwardly through the buret for illuminating the meniscus of liquid in the buret. Thus, the chemist is enabled to more easily see the meniscus of liquid in making initial and final buret readings. Also, when lamp 65 is energized, a signal is provided indicating that the apparatus is open to the atmosphere and should be closed by setting valve 23 in the closed position if the apparatus is not in use. When handle 29 is turned to the position shown in dotted lines in Figures 5 and 6, thereby setting valve 23 in the closed position (Figure 3), spring finger 59 is deflected to the position shown in dotted lines in Figures 5 and 6 so as to engage button 61 to open switch 43 and deenergize lamp 65 in the bottom of buret 1. In this way, the chemist, by observing whether lamp 65 is energized or deenergized, is able to determine at a glance whether or not the titration apparatus of the invention is open or closed to the atmosphere.

If the buret-pipet is of large volume, requiring more than a single actuation of bulb 21, the repeated actuation as described may be facilitated by providing tube 37 with a check valve comprising a hole H in tube 37 and a rubber sleeve 60 thereover flexible enough to yield to pressure for the escape of air when the bulb is compressed, but sealing the hole upon release of the bulb. Accordingly a series of vent and fill operations may be effected while the valve plug remains in the Figure 4 position.

The integration of buret or pipet and reagent bottle via a unique arrangement of valving, tubing, bulbs and clamp permits rapid and simple filling of the buret or pipet within seconds after attaching to the reagent bottle. This same arrangement results in minimum contact of reagent with the atmosphere. This essentially eliminates problems due to evaporation or reagent solvents to the atmosphere and contaminating gases from the atmosphere. Further contamination due to use of dirty funnels, beakers, etc. for filling is eliminated. The compact assembly of the unit permits easy storage of reagent solutions in their original bottles with buret attached. This means immediate availability of reagent. For reagents in continual use the integrated arrangement requires less space and lower elevations than with the usual titration apparatus, which reduces the effort required changing reagents.

As various changes could be made in the above constructions without departing from the scope of the invention, it is intended that all matter contained in the above description or shown in the accompanying drawings shall be interpreted as illustrative and not in a limiting sense.

What is claimed is:

1. Titration apparatus comprising a container for liquid to be titrated, a buret mounted alongside the container, a conduit from the container direct to the lower portion of the buret, a closure for said conduit, an evacuating device connected directly to the upper end of the buret independently of the container and said conduit, a conduit leading from said evacuating device into the container and to the exterior of the apparatus, independently of the first-mentioned conduit, and valve means in said latter-mentioned conduit operable manually, selectively, to close the same to the container and open the same to the exterior of the apparatus, or to open the same to the container and close the same to the exterior of the apparatus, or to close the same to both the container and to the exterior of the apparatus.

2. Titration apparatus comprising a closed container for liquid to be titrated, a buret mounted alongside the container, a first tube extending from the container to the buret and joining the buret near the lower end of the buret, a closure for said first tube, evacuating means, a connection between said evacuating means and the upper end of the buret, a valve having three ports, a second tube between a first of said ports and said connection, a third tube extending from a second of said ports downwardly into the container and having its lower end open and above the liquid in the container, the third port venting the apparatus, said valve being adapted to be set in a closed position in which the first port is connected to the second port and the second and third ports are closed to the atmosphere, and to be set in a venting position in which the first port is connected to the third port and the second port is closed to the atmosphere, and to be set in a fill position wherein the second port is connected to the third port and the first port is closed to the atmosphere.

3. Titration apparatus according to claim 1 in which the buret, the evacuating device, conduit, and the manually operable valve means are all mounted on the container and comprise therewith a single readily portable unit.

4. Titration apparatus comprising a container stopper, an elongated tube having inverted U-shape contour with one leg extending downwardly through said stopper and below the lower end of the other leg, a stopcock in the latter mentioned leg, a three-way valve carried on said stopper and including a body having a port and a pipe leading downwardly therefrom alongside said first mentioned tube leg, another port in said valve body and a conduit leading laterally therefrom, a buret mounted on said conduit and on the lower end of the second mentioned tube leg, a drain valve on the lower end of said buret, a collapsible bulb open direct to the upper portion of said buret and to said conduit, said valve body having a third port venting the apparatus, said stopper, tube, valve, conduit, bulb and buret comprising an assembly applicable as a unit to an open top container, and said valve, stopcock and bulb being movable to different positions to exhaust air from the buret, to selectively draw liquid through said tube into the buret, to vent the apparatus and to accommodate discharge from the buret through said draincock.

5. Titration apparatus as set forth in claim 1 wherein a lamp is mounted at the lower end of the buret and illuminates the meniscus of liquid in the buret.

6. Titration apparatus as set forth in claim 1, further comprising an electrical lamp associated with the apparatus and a circuit therefor closed by the valve structure when said valve means is set to vent the evacuating means while closing off the container from the exterior of the apparatus and also when said valve means is set to close off the evacuating means from the exterior of the apparatus and open the container to the exterior of the apparatus.

7. Titration apparatus as set forth in claim 6 wherein the lamp is mounted at the lower end of the buret and illuminates the meniscus of liquid in the buret.

8. Titration apparatus according to claim 3, in which the unit includes an electric lamp at the lower end of the buret and illuminating the meniscus of liquid in the buret, a battery and a circuit associated with the lamp, and a switch opening the circuit when the manually operable valve is set to close off the container and the evacuating means from the exterior of the apparatus, and closing the circuit at other settings of said means.

References Cited in the file of this patent

UNITED STATES PATENTS

| 1,533,753 | Munch | Feb. 26, 1923 |
| 2,206,816 | Levitt | July 2, 1940 |

FOREIGN PATENTS

| 197,538 | Great Britain | May 17, 1923 |
| 1,096,199 | France | Dec. 29, 1954 |

OTHER REFERENCES

Eimer and Amend Lab. Apparatus Catalogue, 1903, p. 82, Fig. 5800.